(12) United States Patent
Shaw

(10) Patent No.: US 11,384,812 B2
(45) Date of Patent: Jul. 12, 2022

(54) TRIPLE MASS FLYWHEEL

(71) Applicant: BorgWarner Inc., Auburn Hills, MI (US)

(72) Inventor: Wesley L. Shaw, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 510 days.

(21) Appl. No.: 16/066,691

(22) PCT Filed: Dec. 14, 2016

(86) PCT No.: PCT/US2016/066484
§ 371 (c)(1),
(2) Date: Jun. 28, 2018

(87) PCT Pub. No.: WO2017/116699
PCT Pub. Date: Jul. 6, 2017

(65) Prior Publication Data
US 2019/0011010 A1    Jan. 10, 2019

Related U.S. Application Data

(60) Provisional application No. 62/271,408, filed on Dec. 28, 2015.

(51) Int. Cl.
*F16F 15/134*    (2006.01)
*F16F 15/31*     (2006.01)
*F16F 15/133*    (2006.01)

(52) U.S. Cl.
CPC ...... *F16F 15/13484* (2013.01); *F16F 15/133* (2013.01); *F16F 15/31* (2013.01); *Y02E 60/16* (2013.01)

(58) Field of Classification Search
CPC .... F16F 15/13484; F16F 15/133; F16F 15/31; Y02E 60/16
(Continued)

(56) References Cited

U.S. PATENT DOCUMENTS 5,226,756 A *  7/1993  Takahashi ............... F02N 15/00
6,424,126 B1   7/2002  Ohsawa
(Continued)

FOREIGN PATENT DOCUMENTS

WO    2007075148 A1    7/2007

OTHER PUBLICATIONS

Murmini, "murmini—MINI Cooper Blog: The Dual Mass Flywheel." Apr. 1, 2007. http://murmini.com/articles/2007/04/01/dmf, Dec. 18, 2015.

*Primary Examiner* — Greg Binda
(74) *Attorney, Agent, or Firm* — Young Basile Hanlon & MacFarlane, P.C.

(57) ABSTRACT

A triple mass flywheel (104, 304, 504, 604) includes a first flywheel part (112, 312, 512, 612), a second flywheel part (114, 314, 514, 614), and a third flywheel part (116, 316, 516, 616) all arranged for rotation on an axis (118, 318). The triple mass flywheel (104, 304, 504, 604) also includes a first torsional damper (120, 320, 520, 620) connected to the first flywheel part (112, 312, 512, 612) and the second flywheel part (114, 314, 514, 614) and a second torsional damper (122, 322, 522, 622) connected to the second flywheel part (114, 314, 514, 614) and the third flywheel part (116, 316, 516, 616). The second flywheel part (114, 314, 514, 614) is driven by an electric motor (110, 310, 510, 610) to adjust the loading of the first torsional damper (120, 320, 520, 620) in relation to the first flywheel part 112, 312, 512, 612) and the second torsional damper (122, 322, 522, 622) in relation to the third flywheel part (116, 316, 516, 616). The electric
(Continued)

motor (110, 310, 510, 610) can also be driven by the second flywheel part (114, 314, 514, 614) to store electrical energy for use in a vehicle.

13 Claims, 6 Drawing Sheets

(58) Field of Classification Search
USPC ............... 464/68.7, 68.8; 192/213.1–213.22
See application file for complete search history.

(56) References Cited

U.S. PATENT DOCUMENTS

| | | | |
|---|---|---|---|
| 6,830,139 B2* | 12/2004 | Carlson | F16D 21/06 192/213.12 |
| 2013/0288854 A1 | 10/2013 | Kobayashi | |
| 2014/0157947 A1 | 6/2014 | Oh et al. | |

* cited by examiner

TRIPLE MASS FLYWHEEL

BACKGROUND

A flywheel is a disc of significant mass that has a high moment of inertia. One function of the flywheel is to resist changes in rotational speed. In the field of vehicle powertrains, a flywheel is connected to the crankshaft of an internal combustion engine. Thus, in an internal combustion engine, the flywheel resists angular acceleration and deceleration of the crankshaft. This resistance to acceleration and deceleration reduces fluctuations in the rotational speed of the crankshaft that would otherwise be caused by linear reciprocal motion of the pistons. Without the flywheel, fluctuations in rotational speed of the crankshaft could cause potentially severe vibrations within the vehicle.

A dual mass flywheel includes two separate flywheel parts that are connected to one another by a torsional damper. The torsional damper connects the two flywheel parts such that relative rotation between them is allowed around the axis of rotation of the flywheel, with the torsional damper resisting relative rotation of the two flywheel parts and urging them to a rotationally neutral position. However, the traditional dual mass flywheel is limited by the spring rate and capacity of the torsional damper, restricting the range of rotational speeds that can be effectively dampened.

SUMMARY

One aspect of the disclosed embodiments is a triple mass flywheel including a first flywheel part arranged for rotation on an axis, a second flywheel part arranged for rotation on the axis, a third flywheel part arranged for rotation on the axis, a first torsional damper that is connected to the first flywheel part and the second flywheel part, and a second torsional damper that is connected to the second flywheel part and the third flywheel part. The second flywheel part is driven by an electric motor to adjust the loading of the first torsional damper in relation to the first flywheel part and the second torsional damper in relation to the third flywheel part.

Another aspect of the disclosed embodiments is a vehicle drivetrain. The vehicle drivetrain includes an engine that provides rotational driving power and a triple mass flywheel that receives the rotational driving power from the engine. The triple mass flywheel includes a first flywheel part arranged for rotation on an axis and in communication with the engine, a second flywheel part arranged for rotation on the axis, and a third flywheel part arranged for rotation on the axis. The first flywheel part and the second flywheel part and the third flywheel part are disposed in series along the axis. The triple mass flywheel also includes a first torsional damper that is connected to the first flywheel part and the second flywheel part and a second torsional damper that is connected to the second flywheel part and the third flywheel part. A damping constant associated with the second torsional damper is lower than a damping constant associated with the first torsional damper.

The vehicle drivetrain also includes an electric motor. The electric motor drives the second flywheel part to adjust the loading of the first torsional damper in relation to the first flywheel part and the second torsional damper in relation to the third flywheel part. The electric motor is alternatively driven by the second flywheel part to store electrical energy for use in a vehicle. The electric motor is spaced from the axis around which the first, second, and third flywheel parts rotate. The vehicle drivetrain also includes a transmission in communication with the third flywheel part that receives rotational driving power.

BRIEF DESCRIPTION OF THE DRAWINGS

The description herein makes reference to the accompanying drawings, wherein like referenced numerals refer to like parts throughout several views.

DETAILED DESCRIPTION

The disclosure herein is directed to triple mass flywheels including three flywheel parts arranged for rotation on an axis. First torsional dampers connect the first flywheel part and the second flywheel part and second torsional dampers of differing damping constants connect the second flywheel part and the third flywheel part, both sets of torsional dampers controlling rotation of the flywheels parts with respect to each other. An electric motor can independently drive the second flywheel part to adjust the loading of the first torsional damper in relation to the first flywheel part and the second torsional damper in relation to the third flywheel part. The electric motor can also be driven by rotation of the second flywheel part to store electrical energy for use, for example, in a hybrid vehicle.

Figure 1:
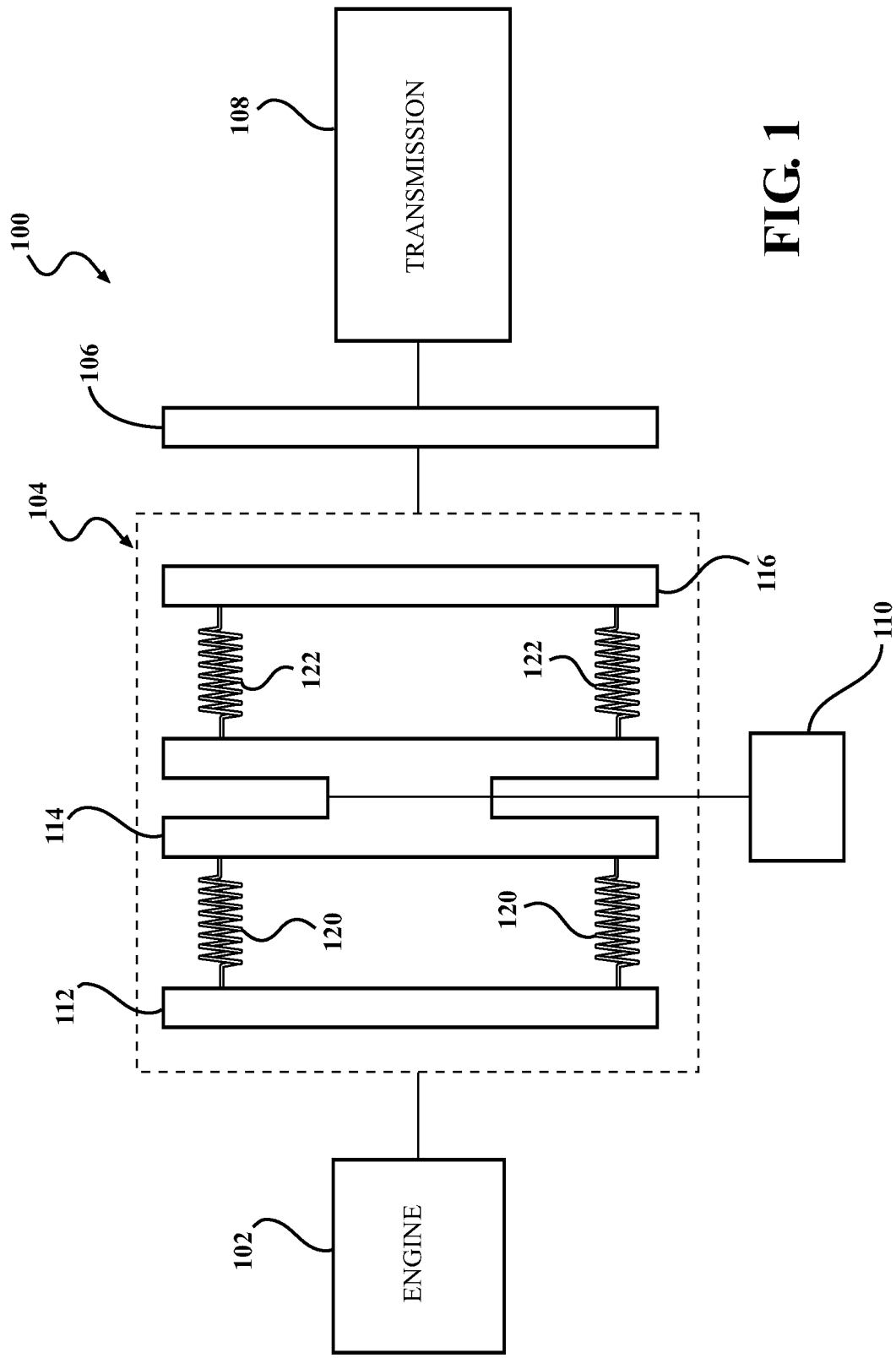
FIG. 1 is a schematic illustration showing a portion of a vehicle drivetrain.

FIG. 1 is an illustration showing a portion of a vehicle drivetrain 100 that includes an engine 102, a triple mass flywheel 104, a clutch 106, a transmission 108, and an electric motor 110.

The engine 102 can be an internal combustion engine such as a linear reciprocating piston internal combustion engine communicating with the rest of the vehicle drivetrain 100 through a crankshaft (not shown). The engine 102 can generate a positive torque pulse when a cylinder (not shown) fires and a negative torque pulse when the cylinder is compressing the fuel/air mixture. The torque pulses are caused by the acceleration/deceleration of the pistons (not shown) and lead to the fluctuations in the rotational speed of the crankshaft.

The clutch 106 can be a selective torque transmission device that is manually operated or electronically controlled. The clutch 106 can have an engaged position, in which the clutch 106 transmits rotational driving power, and a disengaged position, in which the clutch 106 does not transmit rotational driving power. In some implementations, the clutch 106 is omitted. The transmission 108 can be a conventional speed and torque conversion device such as a manual transmission, an electronically controlled manual transmission, an automatic transmission, or a continuously variable transmission. The electric motor 110 can have a traditional rotor and stator configuration and can be an electric traction motor used in a hybrid vehicle and/or an electric motor used to start the engine 102.

The vehicle drivetrain 100 is an example of an implementation in which the triple mass flywheel 104 can be used. In this example, rotational driving power from both the engine 102 and the electric motor 110 is delivered to the triple mass flywheel 104. The driving power is then provided to the clutch 106. The clutch 106, when in its engaged position, delivers the driving power to the transmission 108. Additional components (not shown) can be incorporated in the automobile drivetrain 100 to deliver the driving power from the transmission 108 to the wheels (not shown) of the vehicle (not shown). Other drivetrain configurations can be utilized in conjunction with the triple mass flywheel 104, including ones in which additional components are interposed between the components included in the illustrated example.

The triple mass flywheel 104 of FIG. 1 includes a first flywheel part 112, a second flywheel part 114, and a third flywheel part 116. All three of the flywheel parts 112, 114, 116 rotate on an axis 118 (see FIG. 2) and are disposed in series along the axis 118, that is, are disposed in sequential order along the axis 118. The first flywheel part 112 receives rotational driving power directly from the engine 102, for example, by connection to the crankshaft of the engine 102, thereby causing rotation of the first flywheel part 112 in unison with the crankshaft. The third flywheel part 116 sends rotational driving power to the transmission 108.

Figure 2:
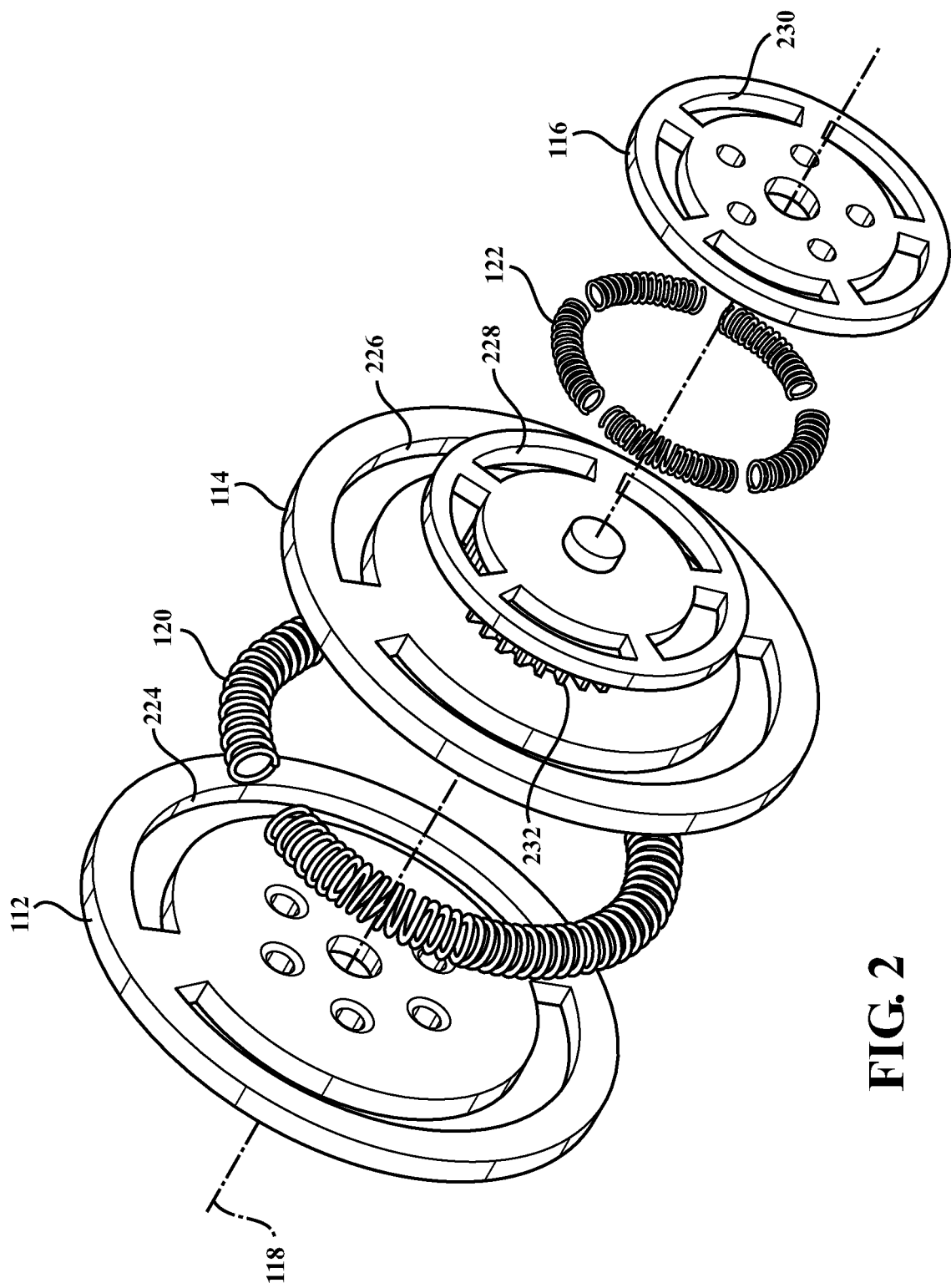
FIG. 2 is a perspective exploded view showing the triple mass flywheel in the vehicle drivetrain of FIG. 1.

FIG. 2 is a perspective exploded view showing the triple mass flywheel 104 of FIG. 1. The second flywheel part 114 is connected to the first flywheel part 112 by a torsional damper 120. The torsional damper 120 connects the first flywheel part 112 to the second flywheel part 114 such that relative rotation of the second flywheel part 114 with respect to the first flywheel part 112 is allowed around the axis 118 over a limited angular range of motion. The torsional damper 120 resists this relative rotation and urges the second flywheel part 114 toward a rotationally neutral position with respect to the first flywheel part 112.

The second flywheel part 114 is also connected to the third flywheel part 116 by a torsional damper 122. The torsional damper 122 connects the second flywheel part 114 to the third flywheel part 116 such that relative rotation of the third flywheel part 116 with respect to the second flywheel part 114 is allowed around the axis 118 over a limited angular range of motion. When the clutch 106 is engaged, the torsional damper 122 resists this relative rotation and urges the third flywheel part 116 toward a rotationally neutral position with respect to the second flywheel part 114.

The torsional damper 120 fits within opposing openings 224, 226 defined within the first flywheel part 112 and the second flywheel part 114. The torsional damper 122 fits within opposing openings 228, 230 defined within the second flywheel part 114 and the third flywheel part 116. The openings 226, 228 in the second flywheel part 114 are axially spaced from each other given the two-part construction of the second flywheel part 114 as shown.

The torsional dampers 120, 122 can be of any currently known design or any later developed design. Here, the torsional dampers 120, 122 are in the form of coil springs. The use of two stages or a series of torsional dampers 120, 122 and three flywheel parts 112, 114, 116 allows approximately twice the rotation possible using a dual mass damper, lowering spring rates and reducing resonance speeds, thus broadening the range of engine operating speeds over which dampening is achieved. In the example of FIG. 2, a damping constant associated with the torsional damper 122 is lower than a damping constant associated with the torsional damper 120 as reflected in the smaller size of the torsional damper 122 when compared to the torsional damper 120.

In the triple mass flywheel 104, the second flywheel part 114 requires a stabilizing connection similar to how the engine 102 is connected to the first flywheel part 112 and to how the clutch 106 is connected to the third flywheel part 116 to avoid uncontrolled free rotation and to implement the series dampening effect, while at the same time tuning the dampening effect based on the torque pulses being received from the engine 102. For example, the electric motor 110 can drive the second flywheel part 114 during cylinder deactivation in the engine 102, a known source of resonance.

The electric motor 110 can be spaced from the axis 118 and drive the second flywheel part 114 of FIG. 2 using a chain (not shown) to engage a sprocket 232 located at the center of the second flywheel part 114. Driving the electric motor 110 can adjust the loading of the torsional dampers 120, 122 in relation to the first flywheel part 112 and the third flywheel part 116 to stabilize the second flywheel part 114. Thus, the electric motor 110 can be used to keep both the second and third flywheel parts 114, 116 from resonating when the clutch 106 is not engaged, for example, when starting the engine 102. This is an improvement over the previously known dual mass flywheel design which requires increased friction inside the dual mass flywheel or additional features, such as locks, to be added to the dual mass flywheel in order to control vibration of the second flywheel part 114 when the clutch 106 is not engaged.

In addition to adding energy to the system by driving the second flywheel part 114, the electric motor 110 can be used to remove energy from the system when driven by the second flywheel part 114. When the second flywheel part 114 drives the electric motor 110, power can be stored or routed, for example, to a vehicle battery (not shown). This is especially useful in a hybrid vehicle drivetrain. The removal of power can be implemented when a driver of the vehicle is fully depressing the accelerator during wide open throttle or when the engine 102 operates within certain speed ranges. FIGS. 1 and 2 describe a first implementation of the triple mass flywheel 104. Additional triple mass flywheel examples are described in reference to FIGS. 3-6 below.

Figure 3:
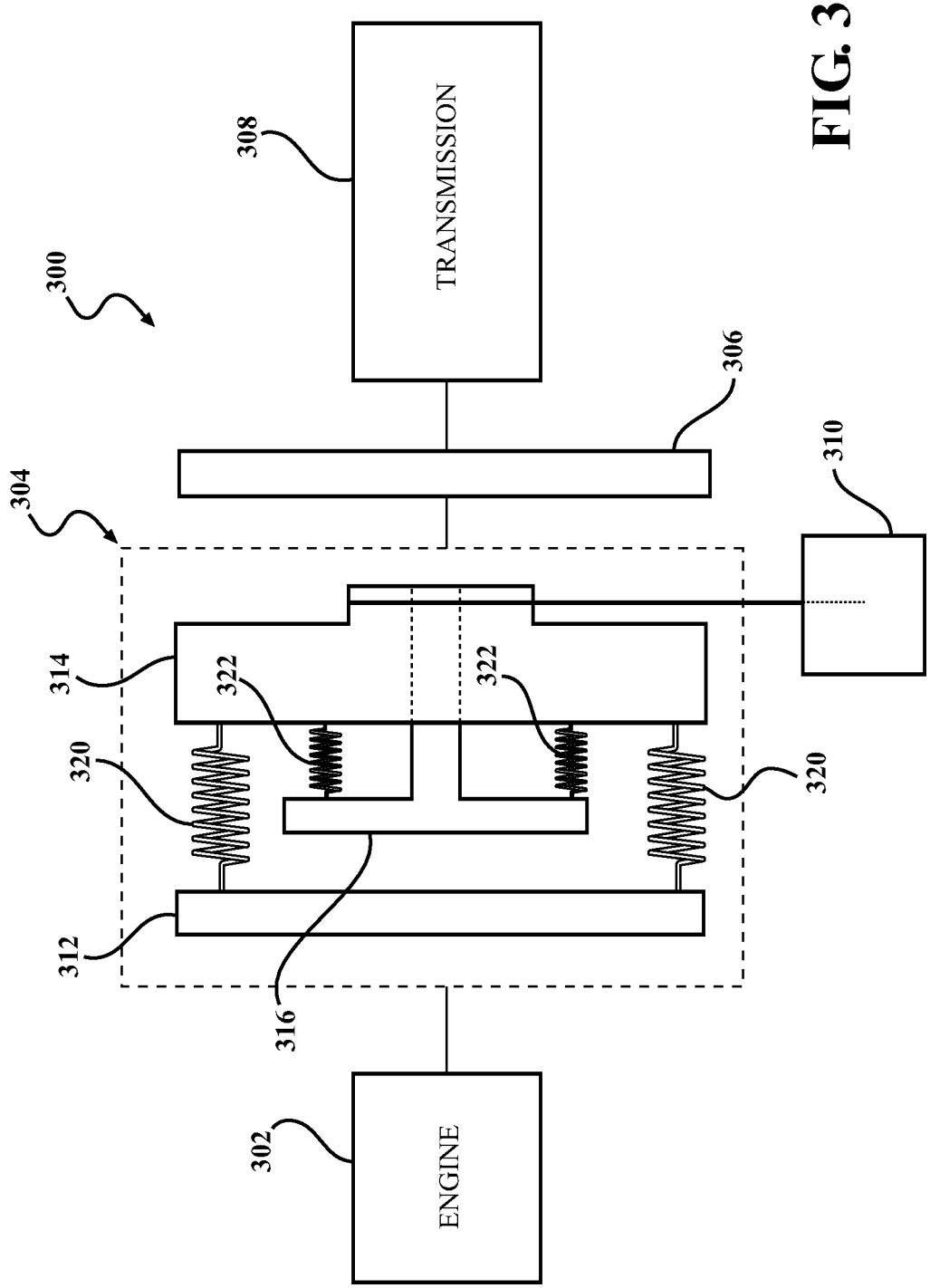
FIG. 3 is a schematic illustration showing a portion of another vehicle drivetrain.

FIG. 3 is a schematic illustration showing a portion of another vehicle drivetrain 300 that includes an engine 302, a triple mass flywheel 304, a clutch 306, a transmission 308, and an electric motor 310. The engine 302, clutch 306, transmission 308, and electric motor 310 are similar to those described in FIG. 1.

The triple mass flywheel 304 of FIG. 3 includes a first flywheel part 312, a second flywheel part 314, and a third flywheel part 316 disposed between and radially within the first flywheel part 312 and the second flywheel part 314. In other words, the first flywheel part 312 and the second flywheel part 314 can form a case or cover housing the third flywheel part 316 in order to conserve packaging space within the vehicle drivetrain 300. All three of the flywheel parts 312, 314, 316 rotate on an axis 318 (see FIG. 4).

The first flywheel part 312 receives rotational driving power directly from the engine 302, and the second flywheel part 314 is connected to the first flywheel part 312 by a torsional damper 320 such that relative rotation of the second flywheel part 314 with respect to the first flywheel part 312 is allowed around the axis 318 over a limited angular range of motion. The torsional damper 320 resists this relative rotation and urges the second flywheel part 314 toward a rotationally neutral position with respect to the first flywheel part 312.

The second flywheel part 314 is also connected to the third flywheel part 316 by a torsional damper 322. The torsional damper 322 connects the second flywheel part 314 to the third flywheel part 316 such that the relative rotation of the third flywheel part 316 with respect to the second flywheel part 314 is allowed around the axis 318 over a limited angular range of motion. When the clutch 306 is engaged, the torsional damper 322 resists this relative rotation and urges the third flywheel part 316 toward a rotationally neutral position with respect to the second flywheel part 314.

Figure 4:
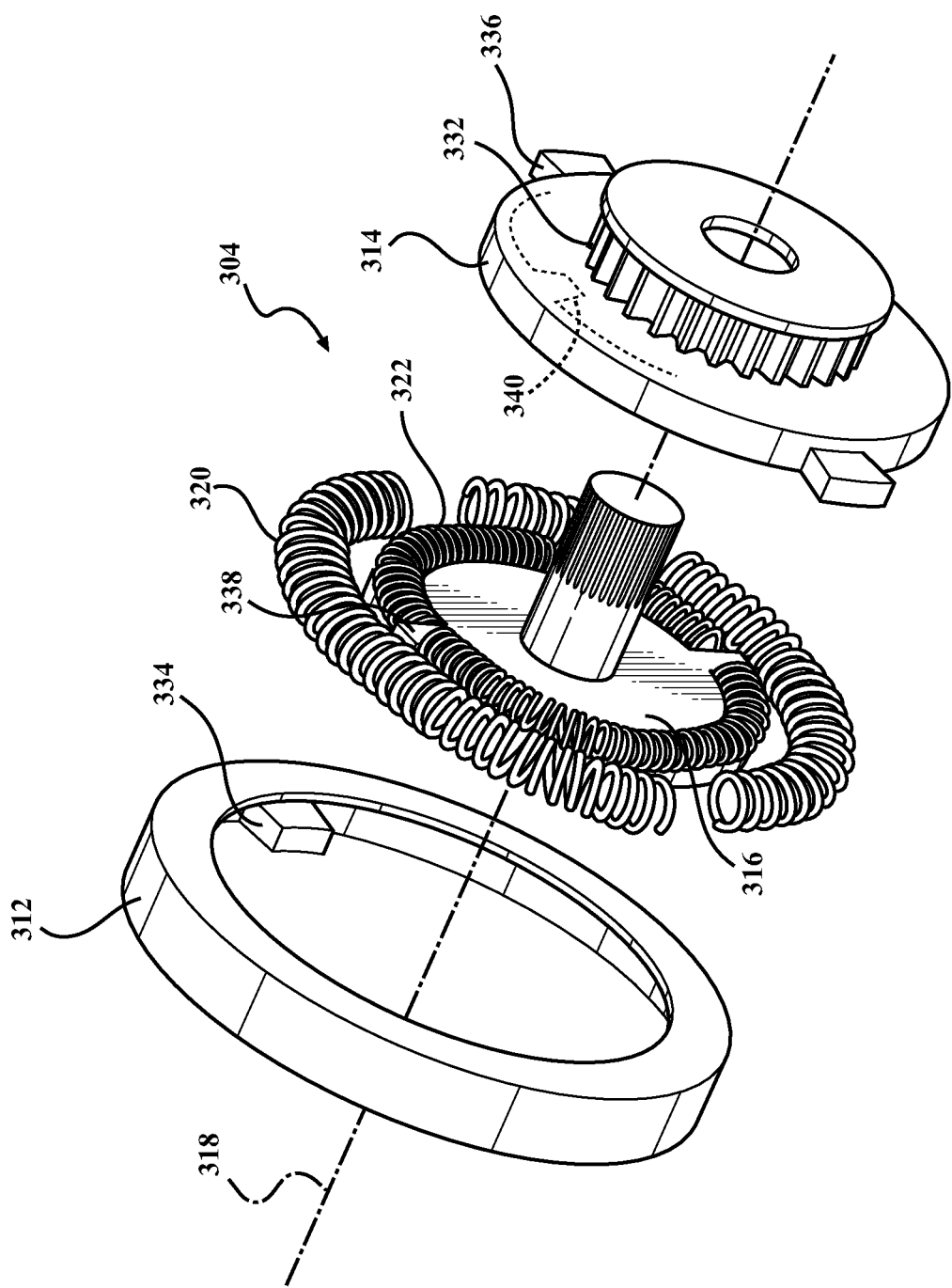
FIG. 4 is a perspective exploded view showing another triple mass flywheel in the vehicle drivetrain of FIG. 3.

FIG. 4 is a perspective exploded view showing the triple mass flywheel 304 in the vehicle drivetrain 300 of FIG. 3. In this triple mass flywheel 304, the torsional damper 320 abuts a projection 334 disposed within the first flywheel part 312 and a projection 336 extending from the second flywheel part 314. The torsional damper 322 abuts a projection 338 extending from the third flywheel part 316 and a projection 340 disposed within the second flywheel part 314. Locating the torsional dampers 320, 322 generally in the same plane perpendicular to the axis 318 allows for reduced packaging space. The torsional dampers 320, 322 can be of any currently known design or any later developed design. Here, the torsional dampers 320, 322 are in the form of coil springs.

In the triple mass flywheel 304 of FIGS. 3 and 4, the electric motor 310 can be spaced from the axis 318 and drive the second flywheel part 314 using a chain (not shown) to engage a sprocket 332 located at an exterior portion of the second flywheel part 314. As was the case with the triple mass flywheel 104 of FIGS. 1 and 2, driving the electric motor 310 can adjust the loading of the torsional dampers 320, 322 in relation to the first flywheel part 312 and the third flywheel part 316 to stabilize the second flywheel part 314. In situations where the engine 302 produces excess power, the electric motor 310 can also be driven by the second flywheel part 314 to store electrical energy.

Figure 5:
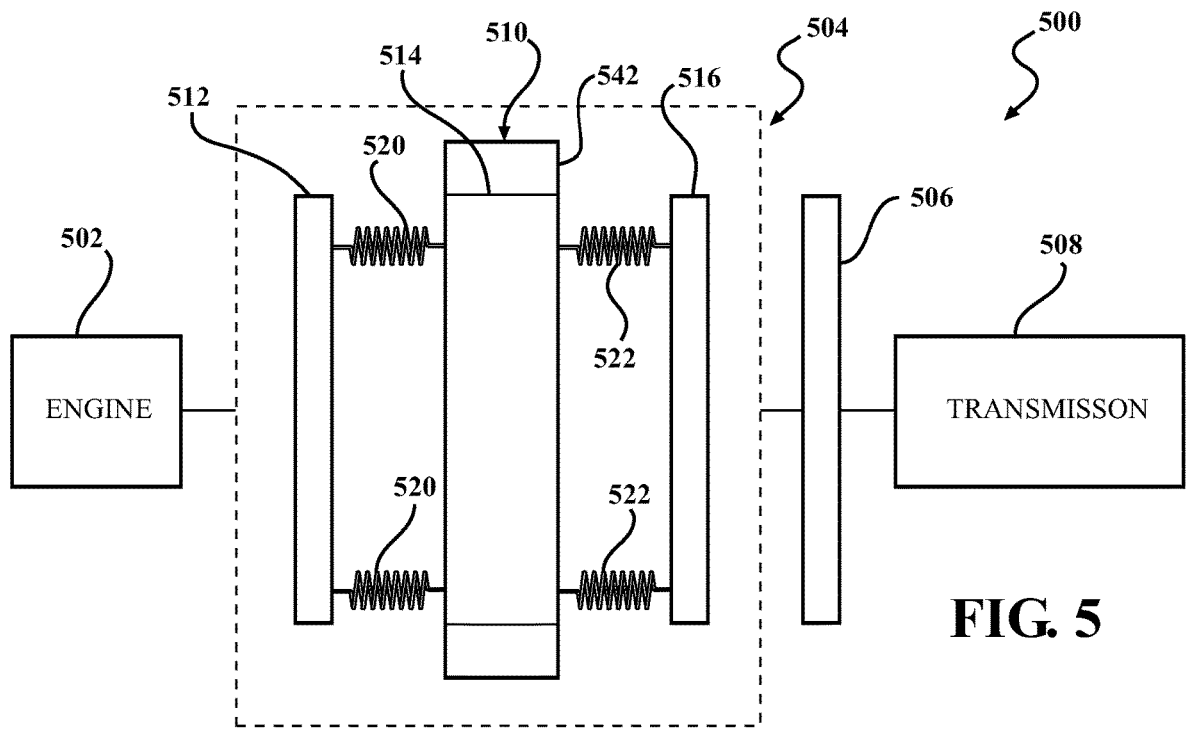
FIG. 5 is a schematic illustration showing a portion of another vehicle drivetrain.

FIG. 5 is a schematic illustration showing a portion of another vehicle drivetrain 500 that includes an engine 502, a triple mass flywheel 504, a clutch 506, a transmission 508, and an electric motor 510. The engine 502, clutch 506, and transmission 508 are similar to those described in reference to FIG. 1.

The triple mass flywheel 504 of FIG. 5 includes a first flywheel part 512, a second flywheel part 514, and a third flywheel part 516 disposed in series. A torsional damper 520 connects the first flywheel part 512 to the second flywheel part 514 such that relative rotation of the second flywheel part 514 with respect to the first flywheel part 512 is allowed over a limited angular range of motion. A torsional damper 522 also connects the second flywheel part 514 to the third flywheel part 516 such that relative rotation of the third flywheel part 516 with respect to the second flywheel part 514 is allowed over a limited angular range of motion. The torsional dampers 520, 522 can be of any currently known design or any later developed design. Here, the torsional dampers 520, 522 are in the form of coil springs.

In the example of FIG. 5, the electric motor 510 is designed to include a stator 542 that surrounds the second flywheel part 514. In turn, the second flywheel part 514 serves as a rotor within the electric motor 510. The stator 542 of the electric motor 510 can drive the second flywheel part 514 in order to tune the dampening effect within the triple mass flywheel 504 by adjusting the loading of the torsional dampers 520, 522 in relation to the first flywheel part 512 and the third flywheel part 516 while at the same time stabilizing the second flywheel part 514. Thus, the electric motor 510 can be used to keep both the second and third flywheel parts 514, 516 from resonating when the clutch 506 is not engaged, for example, when starting the engine 502. In situations where the engine 502 produces excess power, rotation of the second flywheel part 514 can be captured by the stator 542 to store electrical energy.

Figure 6:
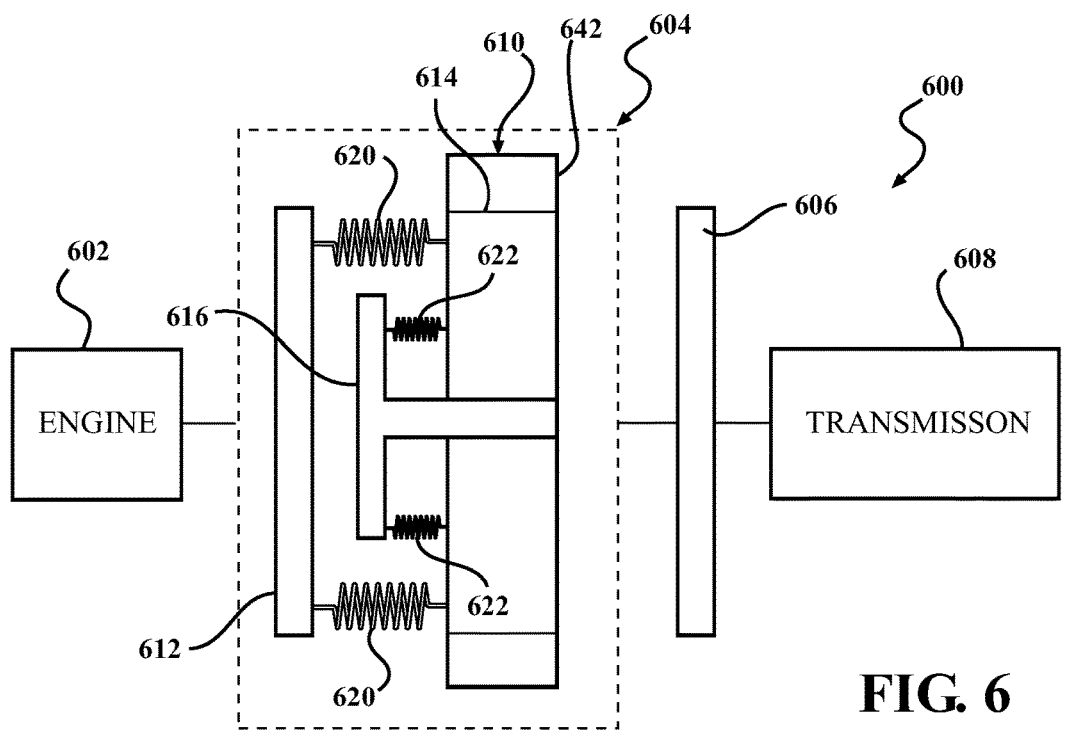
FIG. 6 is a schematic illustration showing a portion of another vehicle drivetrain.

FIG. 6 is a schematic illustration showing a portion of another vehicle drivetrain 600 that includes an engine 602, a triple mass flywheel 604, a clutch 606, a transmission 608, and an electric motor 610. The engine 602, clutch 606, and transmission 608 are similar to those described in reference to FIG. 1.

The triple mass flywheel 604 of FIG. 6 includes a first flywheel part 612, a second flywheel part 614, and a third flywheel part 616 disposed between and radially within the first flywheel part 612 and the second flywheel part 614. The first flywheel part 612 and the second flywheel part 614 form a case or cover housing the third flywheel part 616 in order to conserve packaging space within the vehicle drivetrain 600. A torsional damper 620 connects the first flywheel part 612 to the second flywheel part 614 such that relative rotation of the second flywheel part 614 with respect to the first flywheel part 612 is allowed over a limited angular range of motion. A torsional damper 622 also connects the second flywheel part 614 to the third flywheel part 616 such that relative rotation of the third flywheel part 616 with respect to the second flywheel part 614 is allowed over a limited angular range of motion. The torsional dampers 620, 622 can be of any currently known design or any later developed design. Here, the torsional dampers 620, 622 are in the form of coil springs.

The electric motor 610 in FIG. 6 is designed to include a stator 642 that surrounds the second flywheel part 614. The second flywheel part 614 serves as a rotor within the electric motor 610. The stator 642 of the electric motor 610 can drive the second flywheel part 614 in order to tune the dampening effect within the triple mass flywheel 604 by adjusting the loading of the torsional dampers 620, 622 in relation to the first flywheel part 612 and the third flywheel part 516 while at the same time stabilizing the second flywheel part 614. Thus, the electric motor 610 can be used to keep both the second and third flywheel parts 614, 616 from resonating when the clutch 606 is not engaged. In situations where the engine 602 produces excess power, rotation of the second flywheel part 614 can be captured by the stator 642 to store electrical energy.

Figure 7:
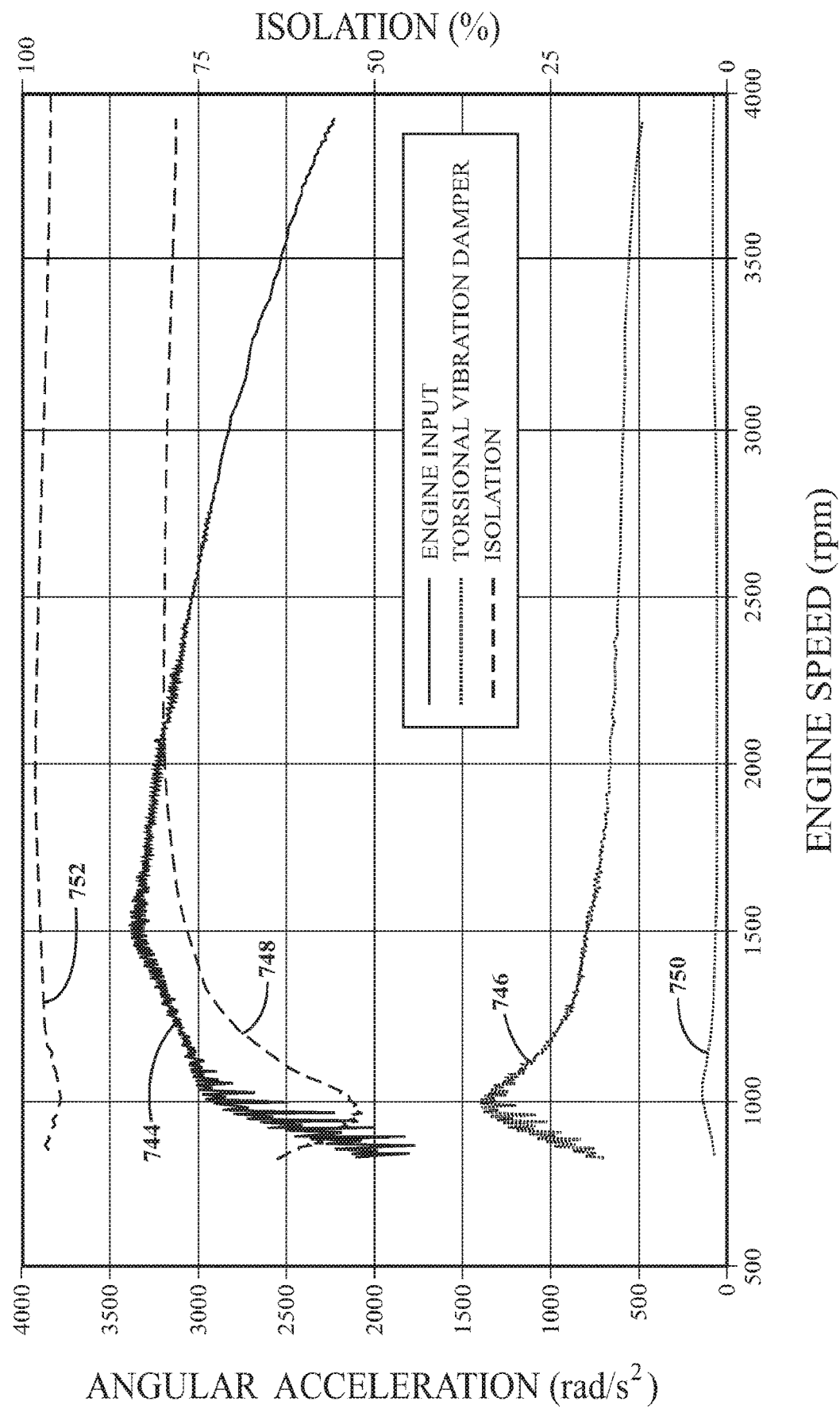
FIG. 7 is a graphical representation of the isolation performance of the triple mass flywheels of FIGS. 1-6.

FIG. 7 is a graphical representation of the isolation performance of the triple mass flywheel 104, 304, 504, or 604 as compared to a dual mass flywheel. Curve 744 shows vibration input from an internal combustion engine, such as the engine 102, 302, 502, or 602, to a vehicle drivetrain, such as the vehicle drivetrain 100, 300, 500, or 600. The engine 102, 302, 502, or 602 can produce a positive torque pulse when a cylinder fires, a negative torque pulse when a cylinder is compressing the air/fuel mixture, and positive or negative torque pulses based on acceleration and deceleration of the pistons. The pulses are sources of vibration and are shown in the units of angular acceleration (rad/s$^2$) against engine speed (RPM) on the curve 744.

Curve 746 shows vibration output for a dual mass flywheel, again in the units of rad/s$^2$ against engine RPM, based on the vibration inputs from the curve 744. At low to medium engine speeds, for example, between 750 RPM and 1,250 RPM, the dual mass flywheel does not effectively dampen the vibration inputs from the engine 102, 302, 502, or 602, and an amplitude spike in vibration output is present, seen on the curve 746 at approximately 1,000 RPM.

Curve 748 shows isolation performance of the dual mass flywheel. Isolation performance is the ratio of the output vibration amplitude divided by the input vibration amplitude, represented by percent isolation at a given engine speed on the right-hand side of the graph. Though optimum flywheel performance would approach 100% isolation, with no vibration in the output of the flywheel, the curve 748 shows an isolation drop-off at 1,000 RPM based on the vibration output spike of the curve 744. In short, the dual mass flywheel can achieve only approximately 50% isolation at 1,000 RPM.

Curve 750 shows vibration output for a triple mass flywheel, such as the triple mass flywheel 104, 304, 504, or 604, again in the units of rad/s$^2$ against engine RPM and based on the vibration inputs from the curve 744. There are no discernable amplitude spikes in vibration output on the curve 750 other than a small rise at approximately 900 RPM. The efficient dampening of the triple mass flywheel 104, 304, 504, or 604 is reflected in curve 752 showing isolation performance. Over the entire range of engine speeds, the triple mass flywheel 104, 304, 504, or 604 achieves over 90% isolation. Thus, isolation at low engine speeds can be improved by up to 40% by implementing the triple mass flywheel 104, 304, 504, or 604 instead of a dual mass flywheel.

While the disclosure has been made in connection with what is presently considered to be the most practical and preferred implementation, it should be understood that the disclosure is intended to cover various modifications and equivalent arrangements.

What is claimed is:

1. A triple mass flywheel engageable with and disposed between an engine and a clutch, comprising:
   a first flywheel part arranged for rotation on an axis;
   a second flywheel part arranged for rotation on the axis;
   a third flywheel part arranged for rotation on the axis;
   a first torsional damper that is connected to the first flywheel part and the second flywheel part;
   a second torsional damper that is connected to the second flywheel part and the third flywheel part; and
   the first flywheel part, the second flywheel part, the third flywheel part disposed in series in sequential order along the axis wherein the third flywheel part is engageable with the clutch, and the first flywheel part and the second flywheel part do not engage the clutch and any other clutch,
   wherein the second flywheel part is driven by an electric motor to adjust the loading of the first torsional damper in relation to the first flywheel part and the second torsional damper in relation to the third flywheel part.

2. The triple mass flywheel of claim 1, wherein the third flywheel part is disposed between and radially within the first flywheel part and the second flywheel part.

3. The triple mass flywheel of claim 1, wherein a damping constant associated with the second torsional damper is lower than a damping constant associated with the first torsional damper.

4. The triple mass flywheel of claim 1, wherein the first flywheel part defines a first opening, the second flywheel part defines a second opening, and the first torsional damper is disposed within the first opening and the second opening.

5. The triple mass flywheel of claim 4, wherein the second flywheel part defines a third opening, the third flywheel part defines a fourth opening, and the second torsional damper is disposed within the third opening and the fourth opening.

6. The triple mass flywheel of claim 5, wherein the second opening and the third opening are spaced apart along the axis.

7. The triple mass flywheel of claim 1, wherein the electric motor is spaced from the axis around which the first, second, and third flywheel parts rotate.

8. The triple mass flywheel of claim 1, wherein the electric motor includes a rotor and a stator and wherein the second flywheel part includes the rotor of the electric motor.

9. The triple mass flywheel of claim 1, wherein the electric motor is driven by the second flywheel part to store electrical energy for use in a vehicle.

10. The triple mass flywheel of claim 1, wherein the second flywheel part includes a sprocket rotatable by a chain driven by the electric motor.

11. The triple mass flywheel of claim 1, wherein the first flywheel part is in communication with the engine that provides rotational driving power to the triple mass flywheel.

12. The triple mass flywheel of claim 1, wherein the third flywheel part is in communication with a transmission that receives rotational driving power from the triple mass flywheel.

13. A vehicle drivetrain, comprising:
   an engine that provides rotational driving power;
   a clutch for engaging and disengaging the rotational driving power;
   a triple mass flywheel that receives the rotational driving power from the engine and the clutch, wherein the triple mass flywheel is disposed between the engine and the clutch;
   a first flywheel part arranged for rotation on an axis and in communication with the engine;
   a second flywheel part arranged for rotation on the axis;
   a third flywheel part arranged for rotation on the axis, wherein the first flywheel part and the second flywheel part and the third flywheel part are disposed sequentially in series along the axis;
   a first torsional damper that is connected to the first flywheel part and the second flywheel part;
   a second torsional damper that is connected to the second flywheel part and the third flywheel part, wherein a damping constant associated with the second torsional damper is lower than a damping constant associated with the first torsional damper;
   an electric motor,
      wherein the electric motor drives the second flywheel part to adjust the loading of the first torsional damper in relation to the first flywheel part and the second torsional damper in relation to the third flywheel part,
      wherein the electric motor is driven by the second flywheel part to store electrical energy for use in a vehicle, and
      wherein the electric motor is spaced from the axis around which the first, second, and third flywheel parts rotate; and
   a transmission in communication with the third flywheel part that receives rotational driving power.

\* \* \* \* \*